United States Patent Office 2,965,536
Patented Dec. 20, 1960

2,965,536

PHENYLHYDRAZINE DERIVATIVES

Van R. Gaertner, Dayton, Ohio, assignor to Monsanto Chemical Company, St. Louis, Mo., a corporation of Delaware No Drawing. Filed Dec. 3, 1956, Ser. No. 625,581

11 Claims. (Cl. 167—30)

The present invention relates to nitrogenous organic compounds and more particularly provides new and valuable derivatives of phenylhydrazine, the method of producing the same, and fungicidal compositions comprising the new compounds.

According to the invention there are provided aminoalkyl and polyalkylenepolyamine derivatives of phenylhydrazine by the addition reaction of phenylhydrazine and ethylenimine substantially according to the scheme:

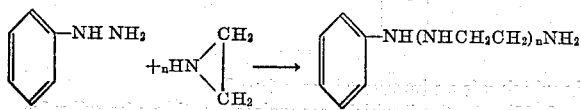

in which $n$ is an integer of from 1 to 8.

Compounds provided by the present invention are 1-(2-aminoethyl)-2-phenylhydrazine which is formed by the addition reaction of one mole of phenylhydrazine with one mole of ethylenimine, and 1-(polyaminoethylene)-2-phenylhydrazines which are formed by the addition reaction of one mole of phenylhydrazine with more than one mole of ethylenimine. For example, the reaction of two moles of ethylenimine with phenylhydrazine yields 1-[N-(2-aminoethyl)-2-aminoethyl]-2-phenylhydrazine

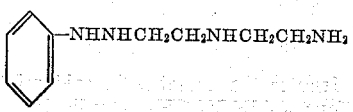

Additional moles of ethylenimine continue to add to each terminal amino radical so that a polyaminoethylene chain of as many as eight 2-aminoethyl radicals may be formed. Generally, upon heating phenylhydrazine with ethylenimine there is obtained a mixture of compounds in which from 1 to 8 moles of the imine have added chainwise at the terminal nitrogen of the phenylhydrazine. The mixture may be resolved, if desired, into the individual compounds by careful fractionation; however, for some purposes, as will be shown hereinafter, close fractionation of the reaction mixture is unnecessary. For example, the crude reaction mixture or wide range distillation fractions thereof may be employed directly as the effective ingredients of fungicidal compositions.

In preparing the present phenylhydrazine derivatives, I simply mix the two reactants, in the presence or absence of an inert diluent and allow the resulting mixture to stand at ordinary or increased temperatures until the ethylenimine has added to the phenylhydrazine. Generally, I prefer to heat the reaction mixture at, say, a temperature of from 50° C., to 200° C. For the production of a preponderance of compounds in which more than one mole of the ethylenimine has added to the phenylhydrazine it is advantageous to employ a large excess of the imine; however, irrespective of the reaction proportions some of the higher addition products are generally formed, since the initially formed 1-(2-aminoethyl)-2-phenylhydrazine reacts very readily with any ethylenimine present. In order to obtain the 1:1 phenylhydrazine-ethylenimine reaction product in a good yield it is recommended that the reaction be effected in the presence of a diluent and/or that the imine be added gradually to the phenylhydrazine.

The present phenylhydrazine-ethylenimine addition products are stable materials which are advantageously employed for a variety of industrial and agricultural purposes, e.g., as lubricant additives, as plasticizers for synthetic resins and plastics and as biological toxicants.

I have discovered that the present phenylhydrazine-ethylenimine additive products are highly efficient for preventing and retarding fungus growth on plants, fruits, seeds, soils, fur, leather, cotton, wool and organic materials in general. They may be applied directly to the organic material which is to be treated, but because the present compounds are effective in extremely dilute concentrations, it is preferred to incorporate them with a carrier or diluent.

Fungicidal dusts may be prepared by mixing the 1-(aminoethyl)-2-phenylhydrazine or the higher addition products with dusting materials such as talc, clay, lime, bentonite, pumice, fuller's earth, etc. The present compounds may be dissolved in organic solvents therefor and the resulting solutions used as fungicidal or fungi-preventing sprays. More expediently, a small quantity of a concentrated solution of the present phenylhydrazine derivatives in an organic solvent, e.g., acetone or cyclohexanone, may be added to water in the presence of an emulsifying agent to form an emulsion and the oil-in-water emulsion thus obtained is employed as a spray. Suspensions or dispersions of the present compounds in water are advantageously employed in the treatment of plant foliage, textiles, leather, or other organic material with which it is not desirable to employ either a solid carrier or an organic solvent.

The present phenylhydrazine-ethylenimine addition products are particularly valuable in the control of cereal rusts, whereby they function as plant chemotherapeutants against the various leaf and stem rusts of wheat, barley, rye and oats and other small grain crop plants. Such cereal rusts as the stem rust *Puccinia graminis tritici*, or the leaf rust *P. rubigo-vera tritici* or the stripe rust *P. glumarum* of wheat usually cannot be controlled by general purpose fungicides. The stem and crown rusts of oats (*P. graminis avenae* and *P. coronata avenae*), as well as the stem rust of rye (*P. graminis secalis*) or the leaf rust (*P. hordei*) of barley display similar resistance.

In prior art, much effort has been expended in breeding rust-resistant strains of these cereals; but as new strains of, e.g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy growth at non-phytotoxic concentrations or because their physical and chemical nature prevents a commercially expedient means of application.

The invention is further illustrated, but not limited, by the following examples:

Example 1

To 216 g. (2 mols) of phenylhydrazine, at room temperature, there was added 43.1 g. (1 mole) of ethylenimine and the resulting mixture was heated (bath) at 65° C., for 17 hours. The heating temperature was then raised to 124° C. and maintained at that temperature for 72 hours, during which time the pot temperature was initially 94° C. at a definite but slow reflux and rose to 105° C. at the end of the 72 hour period. Heating was then continued for about eight days at a slowly increasing bath temperature of from 124°–195° C. and a pot temperature of from 105° C. to 156° C. At this point the reaction mixture had changed from light yellow to amber, had become somewhat turbid and there was little reflux. Distillation in a 2 ft. "zigzag" column gave (I) substantially pure 1-(2-aminoethyl)-2-phenylhydrazine, B.P. 115–116° C./0.3–0.4 mm., $n_D^{25}$ 1.5850 analyzing 27.63% nitrogen as against 27.8%, the calculated value; and (II) a residue boiling above 150° C., $n_D^{25}$ 1.5553, having an average molecular weight of 280.42, and analyzing 29.97% nitrogen. The calculated value for $C_6H_5NH(NHCH_2CH_2)_4NH_2$ is 30.0. (II) is thus a mixture of 1-(aminopolyethyleneamino)phenylhydrazines in which an average of 4 aminoethylene radicals are present.

*Example 2*

This example describes testing of the wheat rust eradicant properties of the 1-(2-aminoethyl)-2-phenylhydrazine and of the mixture of polyamino compounds $$C_6H_5NH(NHCH_2CH_2)_4NH_2$$

which were prepared in Example 1. The following procedure was used:

Five uniform, six-day old seedlings of a rust-susceptible variety of wheat (Seneca) were sprayed with water by means of an atomizer. The individual leaves were then gently rubbed between the thumb and index finger to remove the "bloom," and inoculated with *Puccinia rubigovera tritici* by gently scraping, up and down the back sides of the rubbed leaves with a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed.

The 1-(2-aminoethyl)-2-phenylhydrazine and said mixture of 1-(aminoethylpolyethyleneamine)-2-phenylhydrazine were respectively added to 5 ml. portions of acetone and there was then introduced to the resulting solution approximately 0.1 ml. of an emulsifying agent known to trade as "Tween 20" and reputed to be a polyoxyethylene sorbitan monolaurate. The resulting mixtures were then respectively diluted with 5 ml. of water to give emulsions containing 0.5% (5000 p.p.m.) by weight of the test phenylhydrazine derivatives.

Spraying of the plants with the emulsions was effected by means of an atomizer, 5 ml. of each emulsion being used per pot (five plants/pot) respectively. The sprayed plants were then returned to the greenhouse and held there for a week. Observation of the plants at the end of that time disclosed that the plants which had been sprayed with either the emulsion of the 1-(2-aminoethyl)-2-phenylhydrazine or of said mixture of 1-(aminoethylpolyethyleneamine)-2-phenylhydrazine were entirely free of rust pustules. No evidence of any phytotoxic effect of the emulsions on the sprayed plants were observed. Similarly inoculated but unsprayed plants which had been maintained in the incubator and greenhouse for the same length of time were found to be badly affected by the rust.

What I claim is:

1. A phenylhydrazine derivative of the formula

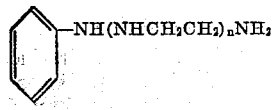

in which $n$ is an integer of from 1 to 8.

2. 1-(2-aminoethyl)-2-phenylhydrazine.

3. A mixture of phenylhydrazine derivatives of the formula

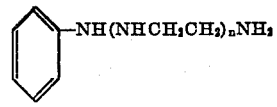

in which $n$ denotes the presence in said mixture of an average of four —$NHCH_2CH_2$— radicals.

4. The method which comprises contacting phenylhydrazine with ethylenimine and recovering from the resulting reaction product a phenylhydrazine derivative of the formula

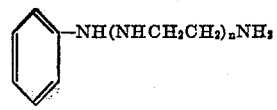

in which $n$ is an integer of from 1 to 8.

5. The method which comprises heating phenylhydrazine with ethylenimine and recovering from the resulting reaction product a phenylhydrazine derivative of the formula

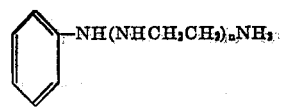

in which $n$ is an integer of from 1 to 8.

6. The method which comprises heating phenylhydrazine with ethylenimine and recovering 1-(2-aminoethyl)-2-phenylhydrazine from the resulting reaction product.

7. The method which comprises heating phenylhydrazine with ethylenimine, separating 1-(2-aminoethyl)-2-phenylhydrazine from the resulting reaction product and obtaining as the residue a mixture of phenylhydrazine derivatives of the formula

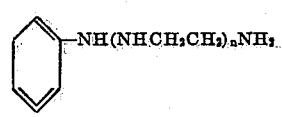

in which $n$ denotes the presence in said mixture of an average of four —$NHCH_2CH_2$— radicals.

8. The method of protecting organic material susceptible to attack by fungi which comprises applying to said material, for the purpose of fungus-proofing a fungicidal composition containing as the essential active ingredient a phenylhydrazine derivative of the formula

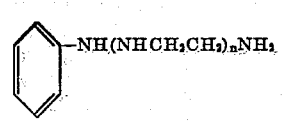

in which $n$ is an integer of from 1 to 8.

9. The method of inhibiting the development of rust on wheat plants which comprises applying to the wheat plants a rust-inhibiting quantity of a wheat rust eradicant comprising as the essential effective ingredient a phenylhydrazine derivative of the formula

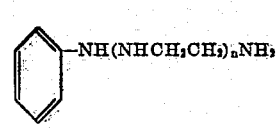

in which $n$ in an integer of from 1 to 8.

10. The method of inhibiting the development of rust on wheat, which comprises applying to the wheat plants a rust-inhibiting quantity of a wheat rust eradicant comprising 1-(2-aminoethyl)-2-phenylhydrazine as the essential effective ingredient.

11. The method of inhibiting the development of rust on wheat which comprises applying to the wheat plants a rust-inhibiting quantity of a wheat rust eradicant comprising as the essential effective ingredient a mixture of phenylhydrazine derivatives of the formula

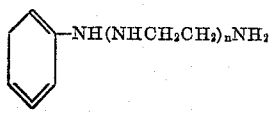

in which $n$ denotes the presence in said mixture of an average of four $—NHCH_2CH_2—$ radicals.

References Cited in the file of this patent

Gever et al: J. Org. Chem. 14, 813–8 (1949).

Beilstein: Band XV, p. 120.

Wagner et al.: Synthetic Organic Chemistry, 2d ed. (1953), pp. 671–2.